United States Patent [19]

Eichenauer et al.

[11] Patent Number: 5,102,939

[45] Date of Patent: Apr. 7, 1992

[54] MIXTURES SUITABLE AS STABILIZERS FOR POLYMERS

[75] Inventors: Herbert Eichenauer, Dormagen; Alfred Pischtschan, Kuerten; Karl-Heinz Ott, Leverkusen, all of Fed. Rep. of Germany

[73] Assignee: Bayer Aktiengesellschaft, Leverkusen, Fed. Rep. of Germany

[21] Appl. No.: 596,410

[22] Filed: Oct. 10, 1990

Related U.S. Application Data

[63] Continuation of Ser. No. 401,465, Aug. 28, 1989, abandoned, which is a continuation of Ser. No. 931,254, Nov. 17, 1986, abandoned.

[30] Foreign Application Priority Data

Nov. 30, 1985 [DE] Fed. Rep. of Germany ....... 3542465

[51] Int. Cl.⁵ .............................................. C08K 5/13
[52] U.S. Cl. .................................... 524/291; 524/343; 524/349; 524/351
[58] Field of Search ............... 524/291, 343, 349, 351, 524/261, 263, 72, 69, 64; 526/224

[56] References Cited

U.S. PATENT DOCUMENTS

| | | | |
|---|---|---|---|
| 3,300,545 | 1/1967 | Baer | 525/261 |
| 3,660,534 | 5/1972 | Carrock et al. | 525/261 |
| 3,781,383 | 12/1973 | Finestone et al. | 524/876 |
| 3,891,722 | 6/1975 | Miloscia et al. | 525/260 |
| 3,928,498 | 12/1975 | Uraneck et al. | 525/261 |
| 4,082,818 | 4/1978 | Coffey et al. | 525/261 |
| 4,098,847 | 7/1978 | Stevenson et al. | 525/261 |
| 4,354,007 | 10/1982 | Scott | 525/350 |
| 4,421,895 | 12/1983 | Echte et al. | 525/261 |
| 4,521,567 | 6/1985 | Arndt et al. | 525/261 |

FOREIGN PATENT DOCUMENTS

| | | |
|---|---|---|
| 0652122 | 2/1965 | Belgium . |
| 0192198 | 8/1986 | European Pat. Off. . |
| 0961797 | 6/1964 | United Kingdom . |

OTHER PUBLICATIONS

J. Am. Chem. Socty. 68, pp. 1422-1431 (1946).

*Primary Examiner*—Veronica P. Hoke
*Attorney, Agent, or Firm*—Connolly & Hutz

[57] ABSTRACT

Stabilizing, synergistically acting mixtures of phenolic antioxidants and sulphur-containing elastic-thermoplastic graft products having terminal thioalkyl groups.

1 Claim, No Drawings

MIXTURES SUITABLE AS STABILIZERS FOR POLYMERS

This application is a continuation of application Ser. No. 401,465, filed Aug. 28, 1989 now abandoned which is a continuation of Ser. No. 931,254 filed Nov. 17, 1986 now abandoned.

The invention relates to mixtures of phenolic antioxidants and sulphur-containing elastically thermoplastic graft products having terminal thioalkyl groups, in which the graft superstrate of the monomers polymerized onto the rubber has a limiting viscosity of 2–15 ml/g (measured in DMF at 25° C.) and their application as synergistically acting stabilizers for polymers.

Synthetic polymers (in particular those having unsaturated bonds in the molecule chain are degraded on exposure to oxygen, heat or light, which causes deterioration of the properties and impedes practical use of the shaped articles prepared from the polymers.

To prevent such degradation, numerous stabilizer mixtures for polymers have been described, including combinations of sterically hindered phenols and sulphur-containing synergists (cf. U.S. Pat. No. 4,321,191 and the references cited therein).

It has now been found that mixtures of phenolic antioxidants and sulphur-containing elastic thermoplastic graft products of resin forming monomers onto rubbers which have terminal thioalkyl groups and the graft superstrate polymer of which has a limiting viscosity of 2–15 ml/g (measured in DMF at 25° C.) and a sulphur content of 1.15–3.95% by weight, are stabilizers for polymers with synergistic activity, high compatibility with the polymer, low volatility and high stability to hydrolysis.

The invention relates to compositions of

A) 1–99 parts by weight, preferably 10–90 parts by weight and particularly preferably 20–80 parts by weight, of a sulphur-containing elastically thermoplastic graft product of styrene, α-methylstyrene, p-methylstyrene, vinyltoluene, acrylonitrile, methyl methacrylate or mixtures thereof as graft superstrate on a particulate rubber having an average particle diameter (d$_{50}$) of 0.05–20.0 μm, preferably 0.1–1.0 μm, and a glass transition temperature $\leq 10°$ C. as graft substrate with a total rubber content of 1–80% by weight, preferably of 10–60% by weight, the graft products having a sulphur content of 1.15–3.95% by weight, preferably of 1.25 to 2.40% by weight, and whose graft superstrate of the monomers polymerized onto the particulate rubber has a limiting viscosity of 2–15 ml/g, preferably of 3–12 ml/g, (measured in dimethyl formamide at 25° C.), and in which at least 90% by weight of the incorporated sulphur is present as a constituent of terminal C$_1$–C$_{18}$-thioalkyl groups, B) 99–1 parts by weight, preferably 90–10 parts by weight and particularly preferably 80–20 parts by weight, of a phenolic antioxidant, C) 0–50 parts by weight, preferably 0–45 parts by weight and particularly preferably 0–40 parts by weight, of a phosphorus-containing stabilizing compound and D) 0–50 parts by weight, preferably 0–45 parts by weight and particularly preferably 0–40 parts by weight, of a nitrogen-containing stabilizing compound.

Sulphur-containing elastic thermoplastic graft products A for the purposes of the invention are in particular products which are obtained by co- or terpolymerization of (ring- or sidechain-substituted) styrene-containing monomer mixtures in the presence of a rubber. These graft polymers can be prepared by generally known solution, suspension or emulsion polymerization or by combining these processes. Emulsion polymerization is preferred and preferably carried out using anionic emulsifiers such as, for example, sodium, potassium or ammonium salts of long-chain fatty acids of 10–20 C atoms, for example potassium oleate, alkyl sulphates of 10–20 C atoms, alkylarylsulphonates of 10–20 C atoms or alkali metal or ammonium salts of the disproportionated abietic acid.

The graft polymerization can be carried out preferably at 30° to 100° C., particularly preferably at 50° to 80° C.

Suitable free radical forming initiators are organic and inorganic peroxides, inorganic persulphates such as, for example, potassium sulphate, azo initiators such as, for example, azobisisobutyronitrile, also redox systems which consist of an oxidizing agent, preferably a peroxide, and a reducing agent. The preferred initiator used is potassium persulphate, and the amounts used are between 0.1 and 1.0% by weight (relative to the amount of monomer).

The graft substrates used are particulate rubbers in an emulsion form and have an average particle diameter (d$_{50}$) of 0.05 to 20.0 μm, preferably 0.1 to 1.0 μm, and a glass transition temperature $\leq 10°$ C. Examples of usable rubbers are polybutadiene, polyisoprene, styrene-butadiene copolymers, acrylonitrilebutadiene copolymers, acrylate rubbers, EPM rubbers (ethylene/propylene rubbers) and EPDM rubbers (ethylene/propylene/diene rubbers with contain as the diene an unconjugated diene such as, for example, hexa-1,5-diene or norbornadiene in small amounts). The average particle diameters are determined by means of an ultracentrifuge (cf. W. Scholtan, H. Lange; Kolloid-Z. u.Z. Polymere 250, pages 782–796 (1972)).

The terminal thioalkyl groups can be introduced by graft polymerization of a mixture of monomers and C$_1$–C$_{18}$-alkylmercaptan in the presence of the graft substrate, the mercaptan acting as a chain transfer agent being incorporated as a terminal thioalkyl group.

In this, the sulphur content introduced by the terminal thioalkyl groups must be at least 90% by weight of all the sulphur present in the polymer. The amount of any sulphur from other sources present in the polymer (for example as a result of incorporation of initiator fragments or as a result of graft reaction of sulphur-containing emulsifiers) is less than 10% by weight of the total sulphur content in the polymer.

Examples of usable C$_1$–C$_{18}$-alkylmercaptans are ethylmercaptan, n-propylmercaptan, n-butylmercaptan, t-butylmercaptan, n-pentylmercaptan, n-hexylmercaptan, n-octylmercaptan, n-decylmercaptan, n-dodecylmercaptan, t-dodecylmercaptan, n-hexadecylmercaptan and n-octadecylmercaptan, Preferred alkylmercaptans are t-dodecylmercaptan and n-dodecylmercaptan and mixtures thereof.

The graft products have a rubber content of 1–80% by weight, in particular 10–60% by weight, the gel contents measured in acetone at 25° C. being 5–95% by weight, in particular 20–80% by weight.

The limiting viscosity of the graft superstrate of monomers polymerized onto the particulate rubber is identical to the limiting viscosity of the chemically unbonded polymer formed "simultaneously" in the course of the graft reaction (cf. Makromol. Chemie 101, pages 200–213 (1967)). Thus the determination of the limiting viscosity is simpler to perform on this easily separated material.

Phenolic antioxidants B for the purposes of the invention are compounds which contain at least one sterically hindered phenolic grouping.

Examples of such compounds are: 2,6-di-t-butyl-4-methylphenol, 2,4,6-tri-t-butylphenol, 2,2'-methylene-bis-(4-methyl-6-t-butylphenol), 2,2'-thio-bis-(4-methyl-6-t-butylphenol), 4,4'-thio-bis-(3-methyl-6-t-butylphenol), 4,4'-butylidene-bis-(6-t-butyl-3-methylphenol), 4,4'-methylene-bis-(2,6-di-t-butyl-phenol), 2,2'-methylene-bis-[4-methyl-6-(1-methylcyclohexyl)phenol], tetrakis [methylene 3-(3,5-di-t-butyl-4-nydroxyphenyl)-propionate]methane, 1,3,5-trimethyl-2,4,6-tris(3,5-di-t-butyl-4-hydroxybenzyl)benzene, N,N'-hexamethylene-bis-(3,5-di-t-butyl-4-hydroxyhydrocinnamide), octadecyl 3-(3,5-di-t-butyl-4-hydroxyphenyl)-propionate, 1,3,5-tris-(3,5-di-t-butyl-4-hydroxybenzyl)-isocyanurate, 1,1,3-tris-(5-t-butyl-4-hydroxy-2-methylphenyl)butane, 1,3,5-tris-(3,5-di-t-butyl-4-hydroxybenzyl)-mesitylene, ethylene glycol bis [3,3-bis-(3'-t-butyl-4-hydroxyphenyl)-butyrate], 2,2'-thio-diethyl bis-3-(3,5-di-t-butyl-4-hydroxyphenyl)propionate, di-(3-t-butyl)-4-hydroxy-5-methylphenyl)dicyclopentadiene, 2,2'-methylene-bis-(4-methyl-6-cyclohexylphenol), 1,6-hexanediol bis-3-(3,5-di-t-butyl-4-hydroxyphenyl)-propionate, 2,4-bis(n-octylthio)-6-(4-hydroxy-3,5-di-t-butylanilino)-1,3,5-triazine, 3,5-di-t-butyl-4-hydroxybenzyl-phosphonate, triethylene glycol bis-3-(t-butyl-4-hydroxy-5-methylphenyl)propionate.

The compositions according to the invention can also contain phosphorus-containing stabilizers C such as distearylpentaerythritol diphosphite, tris-(nonylphenyl) phosphite, tetrakis-(2,4-di-t-butylphenyl-4,4'-biphenylylene diphosphonite, tris-(2,4-di-t-butylphenyl) phosphite, neopentylglycol triethylene glycol diphosphite, diisodecyl pentaerythritol diphosphite, tristearyl phosphite, trilaunyl phosphite, triphenyl phosphite and/or nitrogen-containing stabilizers D, preferably aromatic amines such as 4,4'-di-t-octyldiphenylamine, phenyl-β-naphthylamine, 4,4'-di-(α,α-dimethylbenzyl)-diphenylamine, N-isopropyl-N'-phenyl-p-phenylenediamine, N-phenyl-2-naphthylamine, phenyl-2-aminonaphthalene.

Preferred sulphur-containing elastic-thermoplastic graft polymers A are products which have been obtained by graft polymerization of a mixture of a) 50–80 parts by weight, preferably 55–75 parts by weight, of styrene, α-methylstyrene, p-methylstyrene, vinyltoluene or mixtures thereof, b) 10–33 parts by weight, preferably 15–30 parts by weight of acrylonitrile, methacrylonitrile or mixtures thereof and c) 7.5–25 parts by weight, preferably 8–15 parts by weight of t-dodecylmercaptan, n-dodecylmercaptan or mixtures thereof on d) 10–200 parts by weight of polybutadiene or of a') 25–75 parts by weight, preferably 30 to 70 parts by weight, of styrene, α-methylstyrene, p-methylstyrene, vinyltoluene or mixtures thereof, b') 25–75 parts by weight, preferably 30 to 70 parts by weight, of methyl methacrylate and c') 7.5–25 parts by weight, preferably 8 to 15 parts by weight of t-dodecylmercaptan, n-dodecylmercaptan or mixtures thereof on d') 10–200 parts by weight of polybutadiene or of a") 10–60 parts by weight, preferably 20 to 50 parts by weight of styrene, α-methylstyrene, p-methylstyrene, vinyltoluene or mixtures thereof, b") 10–60 parts by weight, preferably 20–50 parts by weight of methyl methacrylate, c") 10–30 parts by weight, preferably 15–27.5 parts by weight, of acrylonitrile, methacrylonitrile or mixtures thereof and d") 7.5–25 parts by weight, preferably 8–15 parts by weight, of t-dodecylmercaptan, n-dodecylmercaptan or mixtures thereof on e") 10–200 parts by weight of polybutadiene or of a'") 50–80 parts by weight, preferably 55–75 parts of methyl methacrylate b'") 10–30 parts by weight, preferably 15–27.5 parts by weight, of acrylonitrile, methacrylonitrile or mixtures thereof and c'") 7.5–25 parts by weight of t-dodecylmercaptan, n-dodecylmercaptan or mixtures thereof on d'") 10–200 parts by weight of polybutadiene.

Preferred phenolic antioxidants B are: 2,6-di-t-butyl-4-methylphenol, octadecyl 3-(3,5-di-t-butyl-4-hydroxyphenyl)-propionate, triethylene glycol bis-3-(t-butyl-4-hydroxy-5-methylphenyl)propionate, 1,6-hexanediol bis-3-(3,5-di-t-butyl-4-hydroxyphenyl)-propionate, 2,4-bis-(n-octylthio)-6-(4-hydroxy-3,5-di-t-butylanilino)-1,3,5-triazine, tetrakis [methylene 3-(3,5-di-t-butyl-4-hydroxyphenyl)propionate]methane, 2,2'-thiodiethyl bis-[3-(3,5-di-t-butyl-4-hydroxyphenyl)-propionate, 2,2'-methylene-bis-(4-methyl-6-cyclohexylphenol), N,N'-hexamethylene-bis-(3,5-di-t-butyl-4-hydroxyhydrocinnamide) or mixtures thereof.

Preferred phosphorus-containing stabilizing compounds are trisnonyl phenyl phosphite and bisstearyl pentaerythritol diphosphite.

Preferred nitrogen-containing stabilizing compounds are those which are derived from diphenylamine.

Particularly preferred stabilizing compositions are those comprising

A) 20–80% by weight of a graft product which was prepared by graft reaction of a mixture of 55–75 parts by weight of styrene, α-methylstyrene or mixtures, 15–30 parts by weight of acrylonitrile, methacrylonitrile or mixtures and 8–15 parts by weight of t-dodedylmercaptan on 10–200 parts by weight of polybutadiene and B) 80–20% by weight of a phenolic antioxidant selected from the compounds 2,6-di-t-butyl-4-methylphenol, octadecyl 3-(3,5-di-t-butyl-4-hydroxyphenyl)-propionate, triethylene glycol bis-3-(t-butyl-4-hydroxy-5-methylphenyl)propionate, tetrakis[methylene 3-(3,5-di-t-butyl-4-hydroxyphenyl)propionate]methane, 2,2'-methylene-bis(4-methyl-6-cyclohexylphenol) or mixtures thereof.

The synergistically acting stabilizer compositions according to the invention are suitable for use as agents for stabilizing polymers against oxidative decomposition or other changes caused by the action of oxygen.

Polymers which can be stabilized by addition of the stabilizer combination are for example acrylonitrile/butadiene/styrene terpolymers (ABS), methyl methacrylate/butadiene/styrene terpolymers (MBS), styrene/acrylonitrile copolymers (SAN), α-methylstyrene/acrylonitrile copolymers, polystyrene, high impact polystyrene (HIPS), polymethyl methacrylate, polycarbonate, polycarbonate/ABS mixtures, polyphenylene oxide, polyphenylene oxide/HIPS mixtures, polyamides, for example, nylon-6, nylon-66, nylon-12, polyesters, for example polyethylene terephthalate, polybutylene terephthalate, polyolefines, for example polyethylene, polypropylene, polyacetals, polyurethanes, polybutadiene, styrene/butadiene rubbers, acrylonitrile/butadiene rubbers, polychloroprene, polyisoprene, butyl rubber, ethylene/propylene/diene (EPDM) rubbers, acrylate rubbers, ethylene/vinyl acetate rubbers, vinylpyridine/butadiene rubbers, vinylpyridine/styrene/butadiene rubbers, vinylpyridine/acrylonitrile/butadiene rubbers, carboxylated rubbers, polyisobutylene.

The stabilizer compositions according to the invention are particularly highly active in the stabilization of ABS polymers, MBS polymers, styrene/acrylonitrile copolymers, α-methylstyrene/acrylonitrile copolymers, high impact polystyrene, polyolefines and rubber polymers.

The amounts used of the stabilizer compositions according to the invention are 0.1 12 parts by weight, and particularly preferably 1-10 parts by weight (in each case relative to 100 parts by weight of polymer to be stabilized).

The stabilizer composition can be added to the polymer material in solid form, as a slurry, as a solution or in the form of a dispersion or emulsion. It is also possible to add the individual constituents of the stabilizer composition in different forms to the polymers. Depending on the state of the polymers to be stabilized, incorporation is effected on kneaders, rolls, in emulsion or in solution.

The invention further relates to stabilized polymeric moulding compositions, characterized in that they contain 0.1-50 parts by weight, preferably 0.5-12 parts by weight and particularly preferably 1 10 parts by weight (in each case relative to 100 parts by weight of polymer) of the stabilizer composition of sulphur-containing graft polymers and phenolic antioxidant.

EXAMPLES AND COMPARATIVE EXAMPLES

The examples below describe the invention in more detail. The parts mentioned are by weight and always relate to solid constituents or polymerizable constituents.

All DSC measurements were carried out using a DSC-2 measuring instrument for Perkin Elmer (purge gas oxygen 3.6 l/h, rate of heating for dynamic measurement 20 K/min. In carrying out the experiments described below, the following substances were used:

A: A sulphur-containing elastically thermoplastic graft product of styrene, acrylonitrile and t-dodecylmercaptan on polybutadiene which is prepared as follows:

50 parts of polybutadiene (in the form of a latex having a solids content of 20% by weight) having an average particle diameter of 0.4 μm are heated under nitrogen to 65° C., whereupon 0.5 part of potassium persulphate (dissolved in 20 parts of water) is added. A mixture of 25.2 parts of styrene, 9.8 parts of acrylonitrile and 15 parts of t-dodecylmercaptan and also 2 parts of the sodium salt of disproportionated abietic acid (dissolved in 25 parts of water) were then added in the course of 4 hours, during which the graft reaction takes place.

A portion of the latex obtained is coagulated in a cold magnesium sulphate/acetic acid solution. The polymer obtained after drying at 70° C. in vacuo has a sulphur content of 2.25%.

The polymer is then extracted in a Soxhlet apparatus with methyl ethyl ketone for 24 hours, after which the solvent is completely removed in vacuo. The polymer remaining behind has a limiting viscosity of 5.4 ml/g (measured in DMF at 25° C.).

B: A sulphur-containing elastically thermoplastic graft product of styrene, acrylonitrile and t-dodecylmercaptan on polybutadiene, which is prepared as follows:

20 parts of polybutadiene (in the form of a latex having a solids content of 11.5% by weight) having an average particle diameter of 0.4 μm are heated under nitrogen to 65° C., whereupon 0.5 part of potassium persulphate (dissolved in 20 parts of water) is added. A mixture of 46.8 parts of styrene, 18.2 parts of acrylonitrile and 15 parts of t-dodecylmercaptan and also 2 parts of the sodium salt of disproportionated abietic acid (dissolved in 25 parts of water) were then added in the course of 4 hours, during which the graft reaction takes place.

A portion of the latex obtained is coagulated in a cold magnesium sulphate/acetic acid solution. The polymer obtained after drying at 70° C. in vacuo has a sulphur content of 2.3%.

The polymer is then extracted in a Soxhlet apparatus with methyl ethyl ketone for 24 hours, after which the solvent is completely removed in vacuo. The polymer remaining behind has a limiting viscosity of 6.1 ml/g (measured in DMF at 25° C.).

C: 2,6-Di-t-butyl-4-methylphenol

D: Triethylene glycol bis-3-(t-butyl-4-hydroxy-5-methylphenyl)propionate (Irganox 245 from Ciba-Geigy)

E: Tetrakis[methylene 3-(3,5-di-t-butyl-4-hydroxyphenyl)-propionate]methane (Irganox 1010 from Ciba-Geigy)

F: Octadecyl 3-(3,5-di-t-butyl-4-hydroxyphenyl)-propionate (Irganox 1076 from Ciba-Geigy)

G: 2,2'-Methylene-bis-(4-methyl-6-cyclohexylphenol).

The polymers listed in Table 1 were stabilized using the stated stabilizers, and the resulting stability was measured by DSC measurements.

The stabilizers were in each case incorporated in the polymers present as aqueous emulsions in the form of emulsions.

TABLE 1

| | Examples and comparative examples (cf. explanations on page 15) | | | |
|---|---|---|---|---|
| Example No. | Polymer | Stabilizer | Incorporation of stabilizer | Thermostability in DSC measurements $T_m$ [°C.] |
| 1(e) | (I) | 3B + 1F | aqueous emulsion | 229 |
| 2(V) | " | — | — | 191 |
| 3(V) | " | 3B | aqueous emulsion | 207 |
| 4(V) | " | 1F | " | 224 |
| 5(e) | (II) | 3A + 1D | aqueous emulsion | 226 |
| 6(V) | " | — | — | 187 |
| 7(V) | " | 3A | aqueous emulsion | 202 |
| 8(V) | " | 1D | " | 211 |
| 9(e) | (III) | 3A + 1F | aqueous emulsion | 258 |
| 10(V) | " | — | — | 229 |
| 11(V) | " | 3A | aqueous emulsion | 241 |
| 12(V) | " | 1F | " | 241 |
| 13(e) | (IV) | 3B + 1C | aqueous emulsion | 194 |
| 14(V) | " | — | — | 178 |
| 15(V) | " | 3B | aqueous emulsion | 186 |

TABLE 1-continued

Examples and comparative examples
(cf. explanations on page 15)

| Example No. | Polymer | Stabilizer | Incorporation of stabilizer | Thermo-stability in DSC measurements $T_m$ [°C.] |
|---|---|---|---|---|
| 16(V) | " | 1C | " | 190 |

Explanations to Table 1
Examples:
(e) according to the invention
(V) comparison
Thermostability in DSC measurements
$T_m$ maximum of exothermic reaction in dynamic measurement
Polymers used:
(I) Graft polymer of 36 parts by weight of styrene and 14 parts by weight of acrylonitrile on 50 parts by weight of polybutadiene
(II) polybutadiene
(III) butadiene/acrylonitrile - 68:32 - copolymer
(IV) butadiene/styrene - 76:24 - copolymer.

It is clear from the examples that the use of the stabilizer compositions according to the invention leads to distinctly better oxidation stabilities of the polymers equipped therewith.

We claim:

1. A method of stabilizing polymers which comprises blending into said polymers a stabilizing efficient amount of a stabilizer composition consisting essentially of an emulsion of:

A) 20–80 parts by weight of sulphur-containing elastic-thermoplastic graft product of styrene, alpha-methylstyrene, p-methylstyrene, vinyltoluene, acrylonitrile, methacrylonitrile, methyl methacrylate or mixtures thereof as graft superstrate on a particulate rubber having an average particle diameter ($d_{50}$) of 0.05 to 20.0 μm and a glass transition temperature $\leq 10°$ C. as graft substrate with a total rubber content of 1–80% by weight, the graft products having a sulphur content of 1.15 to 3.95% by weight, whose graft superstrate of monomers polymerized onto the particulate rubber has a limiting viscosity of 21-15 ml/g (measured in dimethylformamide at 25° C.) and in which at least 90% by weight of the incorporated sulphur is present as at least one chemically bonded $C_1$–$C_{18}$ thioalkyl group on the terminal portions of the grafted thermoplastic products molecules, B) 20–80 parts by weight of a phenolic antioxidant, C) 0–50 parts by weight of a phosphorus-containing stabilizing compound and D) 0–50 parts by weight of a nitrogen-containing stabilizing compound.